(12) United States Patent
Fabre-Raimbault et al.

(10) Patent No.: US 8,000,845 B2
(45) Date of Patent: Aug. 16, 2011

(54) METHOD AND DEVICE FOR DYNAMICALLY ALLEVIATING LOADS GENERATED ON AN AIRPLANE

(75) Inventors: Nathalie Fabre-Raimbault, Toulouse (FR); Marco Adurno, Milan (IT); Mathieu Berthereau, Auterive (FR); Stéphane Cote, Toulouse (FR)

(73) Assignee: Airbus France, Toulouse (FR)

( * ) Notice: Subject to any disclaimer, the term of this patent is extended or adjusted under 35 U.S.C. 154(b) by 685 days.

(21) Appl. No.: 12/038,711

(22) Filed: Feb. 27, 2008

(65) Prior Publication Data

US 2008/0265104 A1    Oct. 30, 2008

(30) Foreign Application Priority Data

Feb. 28, 2007    (FR) ..................................... 07 01440

(51) Int. Cl.
*B64C 13/16*    (2006.01)
*G06F 19/00*    (2006.01)

(52) U.S. Cl. .................. 701/3; 701/7; 701/10; 340/949; 244/76 C

(58) Field of Classification Search ................. 701/3, 10, 701/7, 9, 5; 340/949, 968, 964; 244/76 C, 244/181
See application file for complete search history.

(56) References Cited

U.S. PATENT DOCUMENTS

| 2,626,115 A | 1/1953 | Atwood |
| 5,186,416 A | 2/1993 | Fabre et al. |
| 5,669,582 A * | 9/1997 | Bryant et al. ............... 244/76 C |
| 7,159,825 B2 * | 1/2007 | Seve ............................. 244/203 |
| 2008/0097728 A1 * | 4/2008 | Delaplace et al. ................. 703/1 |

FOREIGN PATENT DOCUMENTS

| EP | 0 435 764 | 7/1991 |
| FR | 2 559 123 | 8/1985 |
| FR | 2 883 983 | 10/2006 |
| GB | 650 305 | 2/1951 |
| GB | 813 297 | 5/1959 |

OTHER PUBLICATIONS

Preliminary Search Report dated Aug. 16, 2007, in English.

* cited by examiner

*Primary Examiner* — Tan Q Nguyen
(74) *Attorney, Agent, or Firm* — Dickinson Wright PLLC

(57) ABSTRACT

A device detects an air disturbance and controls the deflection of aircraft control surfaces when the disturbance is detected.

13 Claims, 2 Drawing Sheets

METHOD AND DEVICE FOR DYNAMICALLY ALLEVIATING LOADS GENERATED ON AN AIRPLANE

FIELD OF THE INVENTION

The present invention relates to a method and a device for dynamically alleviating loads generated on an airplane by a disturbance due to wind.

BACKGROUND OF THE RELATED ART

It is known that, in the context of a load certification of transport airplanes, it is necessary to consider a number of regulatory dimensioning cases linked respectively:
- to a maneuver;
- to a discrete gust; and
- to a continuous turbulence.

The latter two load cases are sometimes greater dimensioning factors than the load cases linked to a maneuver. It would therefore be advantageous to be able to alleviate the load levels associated with a discrete gust and with a continuous turbulence, which would make it possible in particular to achieve a saving on the structural weight of the wings of the airplane.

It will be noted that, through patent application FR-2 883 983, a method and a device are known that are intended to measure the turbulence of the air in the environment of an aircraft. This device uses, to this end, lidars which are mounted on the aircraft.

SUMMARY OF THE INVENTION

The present invention relates to a method of dynamically alleviating loads generated on an airplane, in particular a transport airplane, by a disturbance due to wind. In the context of the present invention, it is considered that a disturbance due to wind can be:
- a discrete gust, that is, a simplified modeling of the wind aiming to represent an isolated turbulence of an extreme intensity; or
- a continuous turbulence, that is, a modeling of the wind aiming to represent atmospheric disturbances that last for a long time and that can excite the structural modes of the airplane that have little damping; or
- other types of turbulences.

To this end, said method of dynamically alleviating loads generated on an airplane by such a disturbance due to wind, is noteworthy, according to the invention, in that:
A/ on a flight of the airplane, a monitoring is applied for detecting a disturbance due to wind, by implementing, automatically and repetitively, the following series of steps:
  a1) at least one incidence value is measured using at least one incidence probe which is provided at the nose of the airplane;
  a2) using this measured incidence value, an incidence value linked to a disturbance due to wind is determined;
  a3) this incidence angle is compared to a first predetermined value; and
  a4) if said incidence angle is greater than this first predetermined value, a disturbance due to wind is detected; and
B/ when a disturbance due to wind is detected, the following series of steps is automatically implemented:
  b1) using said incidence angle, deflection commands are determined for control surfaces of the airplane, which are provided on the wings of said airplane, these deflection commands being such that they generate a deflection of said control surfaces according to a particular deflection angle, and this at a maximum deflection speed; and
  b2) the duly determined deflection commands are applied to said control surfaces.

Thus, thanks to the invention, it is possible to detect, accurately and reliably, a disturbance due to wind, such as a discrete gust or a continuous turbulence for example, which can generate an increase of the loads on the wings of an airplane.

Furthermore, when such a disturbance is detected, the deflection of control surfaces is ordered so as to alleviate these loads. The deflection of these control surfaces is applied at a maximum speed, which makes it possible to limit the flexing of the wings caused by the disturbance and makes it possible to dynamically alleviate the load level existing on the wings, as detailed further hereinbelow.

Thanks to this dynamic alleviation of the loads, it is possible in particular to obtain a saving on the structural weight of the wings of the airplane, which makes it possible in particular to alleviate the cost of building and operating said airplane.

It will be noted that the present invention implements a passive function for alleviating loads induced by a disturbance due to wind, that is, one for which the deflection remains constant immediately the disturbance has been detected once.

Furthermore, in a particular embodiment, in the step a4), it is also possible to detect the end of a disturbance due to wind (disturbance that has previously been detected), and in the step b2), said deflection commands are applied to said control surfaces continuously for a predetermined time, for example five seconds, after said end (duly detected) of this disturbance. This particular embodiment makes it possible to obtain the following advantages:
- avoiding various aeroelastic couplings;
- having the deflection implemented in accordance with the present invention also operate as a PTA (Passive Turbulence Alleviation) function. In practice, this predetermined time, and an activation threshold and a gain specified hereinbelow, are chosen such that in very severe turbulence the control surfaces are deflected to the maximum and remain deflected throughout the turbulent flight phase; and
- avoiding monitoring information relating to the wind to warn of oscillator failures.

As indicated previously, the incidence angle calculated in the step a2 is linked to a disturbance due to wind, that is, in particular, to a discrete gust or to a continuous turbulence. It is known that such a disturbance relates to high-frequency components of the wind. This incidence angle is calculated so as not to apply the dynamic alleviation according to the invention, in a maneuver and/or for constant, non-turbulent wind. It is therefore necessary to determine an incidence angle that takes account of the incidence value actually measured on the airplane, but for which the components relating to effects that should not be taken into account have been eliminated.

In a particular embodiment, in the step a2), said incidence angle $\alpha GLA$ is determined using an incidence value $\alpha 1$ that is subjected to a high-pass filtering. This high-pass filtering is used to eliminate the continuous component of the wind corresponding to a constant wind (for which there is no need to implement the method according to the invention), in order to retain only the high-frequency part of the wind which represents the disturbance that is to be detected. To this end, said incidence value $\alpha 1$ is calculated beforehand, advantageously, using the following expression:

$$\alpha 1 = \alpha air - \alpha gr - \alpha cor$$

in which:
- $\alpha air$ is an incidence angle which is determined from said measured incidence value;
- $\alpha gr$ represents a ground incidence at the center of gravity of the airplane; and
- $\alpha cor$ is a corrective term.

In this case, advantageously:
- in the step a1), a pitch acceleration $q1$ and a true speed VTAS of the airplane are also measured; and
- in the step a2), said incidence angle $\alpha air$ is calculated using the following expression:

$$\alpha air = \alpha mes + (q1 . LAOA)/VTAS$$

in which:
- $\alpha mes$ is said measured incidence value; and
- LAOA is the distance between said incidence probe (which measures the incidence value $\alpha mes$) and the mean center of gravity of the airplane.

Furthermore, advantageously:
- in the step a1), components relative to the airplane are also measured which are defined relative to geographic axes; and
- in the step a2), the incidence $\alpha gr$ is calculated using the following expression:

$$\alpha gr = A . tg(Uz1/Ux1)$$

in which:
- A is a predetermined coefficient;
- tg is a tangent; and
- Uz1 and Ux1 are the coordinates of the ground speed relative to vertical and longitudinal axes of the airplane, which are determined from said measured components.

Furthermore, advantageously:
- in the step a1), components relative to the airplane are measured which are defined relative to geographic axes; and
- in the step a2), the corrective term $\alpha cor$ is calculated using the following expression:

$$\alpha cor = (B . Wz1)/VTAS$$

in which
- B is a predetermined coefficient;
- Wz1 is a vertical component of the wind, which is determined from said measured components; and
- VTAS is the true speed of the airplane.

The calculation of this corrective term $\alpha cor$ makes it possible to eliminate, in the incidence angle $\alpha GLA$ used, the effects of a maneuver (in particular, the effects of $\phi$ projection).

As indicated previously, said control surfaces are deflected at a maximum deflection speed. In a simplified embodiment, simply the maximum possible deflection speed is used for the control surfaces concerned.

However, in a preferred embodiment, the speed limiters of the actuators are modified in the flight control computers so as to obtain speeds which are greater than the maximum speeds usually authorized for said control surfaces. More specifically, (usually) these speed limiters are modified so as to obtain a maximum deflection speed which is such that the excitation profile generated on the wings by the deflection of said control surfaces resembles, to within a margin, the profile of the wind which is the cause of said disturbance. This makes it possible to obtain a particularly effective alleviation of the loads generated on the wings.

Moreover, in a particular embodiment, said airplane comprises a plurality of ailerons provided on its wings, and said control surfaces represent the various ailerons of the airplane, which are deflected symmetrically relative to the longitudinal axis of the airplane, when said deflection commands are transmitted.

Furthermore, in a particular embodiment, in the step b1), deflection commands are determined which generate, on each control surface, in particular on each aileron:
- a maximum deflection angle, for example 15°, when said incidence angle $\alpha GLA$ is greater than or equal to a second predetermined value, for example 3.5°, which is greater than said first predetermined value, for example 1°; and
- a particular deflection angle, when said incidence angle $\alpha GLA$ is between said first and second predetermined values, the value of said particular deflection angle being obtained from a linear relation between a zero angle with said first predetermined value and an angle corresponding to said maximum deflection angle with said second predetermined value.

The dynamic alleviation of the loads, implemented by the present invention, is therefore activated when the incidence angle exceeds a given threshold, corresponding to said first predetermined value. Taking this threshold into account makes it possible to avoid any triggering of the alleviation function for low turbulences. This makes it possible in particular to avoid overworking the actuators of the control surfaces. Furthermore, this threshold makes it possible to make the decoupling between the wind and the maneuver more robust.

Moreover, in a particular embodiment:
- in the step A, the current values of the weight, the speed, the altitude and the configuration of the airplane are also determined; and
- in the step B, said substeps b1) and b2), are implemented, only if the following conditions are all satisfied, taking into account said duly determined current values:
  - the weight of the airplane is situated within a predetermined weight range;
  - the speed of the airplane is situated within a predetermined speed range;
  - the altitude of the airplane is less than a predetermined maximum altitude; and
  - the configuration of the airplane is a smooth configuration.

Thus, the activation range of the alleviation function according to the present invention is limited to only load stresses, in order not to activate it (and therefore not to reduce the maneuvering capability of the airplane) for cases which do not pose problems regarding the loads.

Moreover, advantageously:
- an auxiliary deflection command is calculated for at least one auxiliary control surface, in particular an elevator of the airplane, which makes it possible to offset a pitch moment (nose up or nose down) generated by the deflection in the step b2) of said control surfaces; and
- this auxiliary deflection command is applied to said auxiliary control surface.

The present invention also relates to a device for dynamically alleviating loads generated on an airplane, in particular a transport airplane, by a disturbance due to wind, such as a discrete gust or a continuous turbulence in particular.

According to the invention said device is noteworthy in that it comprises:

first means for monitoring the airplane, making it possible to detect a disturbance due to wind on a flight of the airplane, said first means comprising the following means which repetitively implement the corresponding operations:

at least one incidence probe which is provided at the nose of the airplane and which can measure an incidence value;

means for determining, using the incidence value measured by said incidence probe, an incidence angle which is linked to a disturbance due to wind, means for comparing this incidence angle to a first predetermined value; and means for deducing from this comparison a detection of a disturbance due to wind, if said incidence angle is greater than this first predetermined value; and second means for determining, when said first means detect a disturbance due to wind, using said incidence angle, deflection commands for control surfaces of the airplane, which are provided on the wings of said airplane, these deflection commands being such that they generate a deflection of said control surfaces according to a particular deflection angle, and this at a maximum deflection speed; and third means for applying said deflection commands to said control surfaces.

Furthermore, in a particular embodiment, said device also comprises:

means for calculating an auxiliary deflection command which is intended for at least one auxiliary control surface, in particular an elevator of the airplane, and which makes it possible to offset a pitch moment (nose up or nose down) generated by the deflection of said control surfaces; and means for applying this auxiliary deflection command to said auxiliary control surface.

BRIEF DESCRIPTION OF THE DRAWINGS

From the figures of the appended drawings, it will be clearly understood how the invention can be implemented. In these figures, identical references denote like elements.

DETAILED DESCRIPTION OF THE INVENTION

Figure 1:
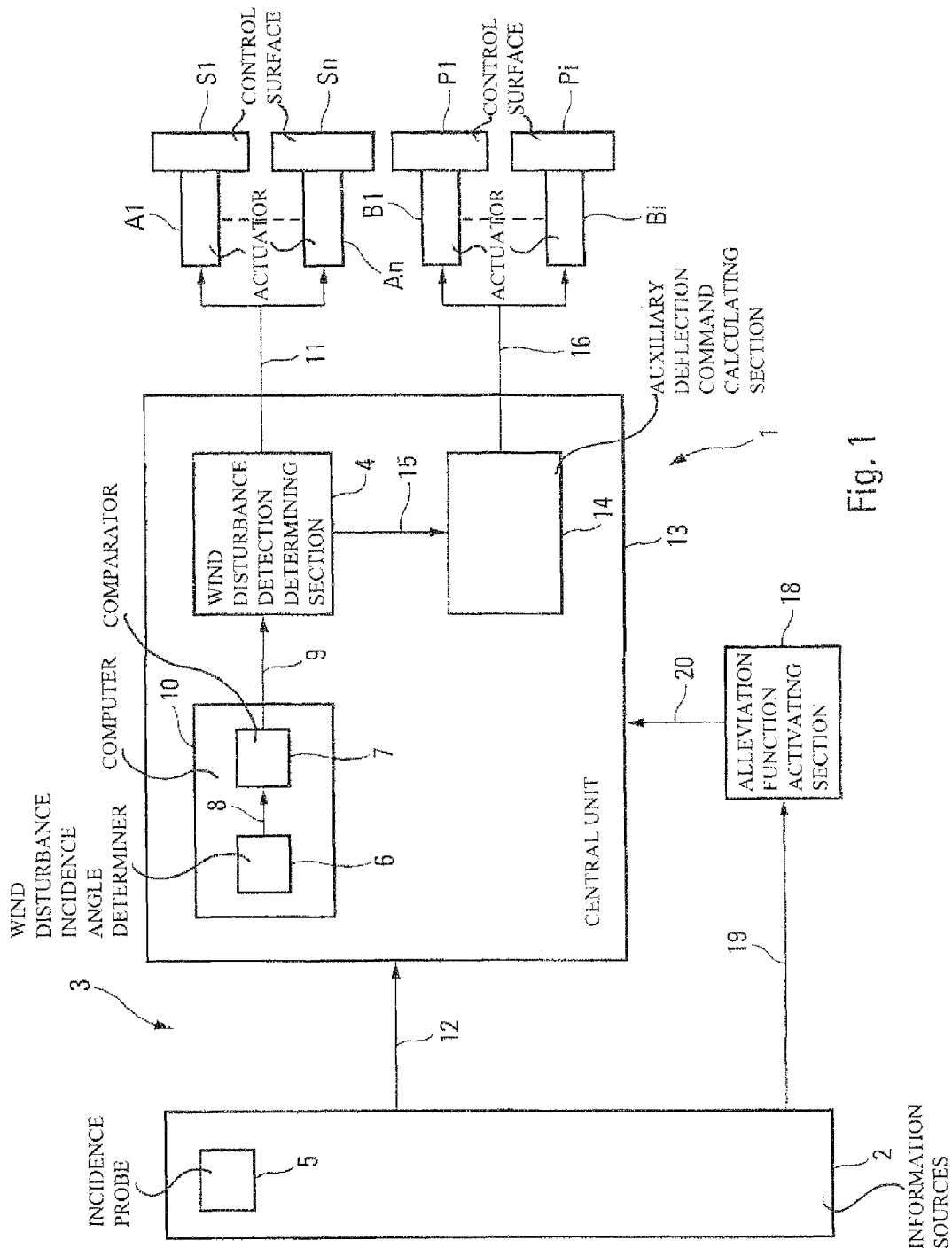
FIG. 1 is the block diagram of a device according to the invention.

The device 1 according to the invention and diagrammatically represented in FIG. 1 is intended to dynamically alleviate loads generated in particular on the wings of an airplane (not represented), for example a transport airplane, these loads being generated by a disturbance due to wind. In the context of the present invention, it is assumed that a disturbance due to wind can be in particular:

a discrete gust, that is, a simplified modeling of the wind aiming to represent an isolated turbulence of an extreme intensity; or a continuous turbulence, that is, a modeling of the wind aiming to represent atmospheric disturbances which last a long time and which can excite the structural modes of the airplane that have little damping; or other types of turbulences.

According to the invention, said device 1 comprises:

a system 2 of information sources which can measure, in the usual way, the parameter values of the airplane, specified hereinbelow;

means 3 which are intended to monitor the airplane so as to be able to detect a disturbance due to wind, of the abovementioned type, on a flight of the airplane;

means 4 for determining, when a disturbance due to wind is detected by said means 3, deflection commands specified hereinbelow for control surfaces S1 to Sn (ailerons, spoilers, etc.) of the airplane, n being an integer number. These control surfaces S1 to Sn are provided on the wings of said airplane. According to the invention, said deflection commands are such that they generate a deflection of said control surfaces S1 to Sn (upward or downward depending on the direction of the disturbance detected, in order to be able to counteract the effects of this disturbance), according to a particular deflection angle, and this at a maximum deflection speed (specified hereinbelow); and usual actuation means A1 to An. Each of these actuation means A1 to An is associated with one of said control surfaces S1 to Sn. These actuation means A1 to An receive the deflection commands determined by said means 4 (via a link 11) and generate a deflection angle BR for each of said control surfaces S1 to Sn, this deflection angle BR being in accordance with said received deflection command.

Furthermore, according to the invention, said monitoring means 3 comprise:

at least one incidence probe 5 which is part of said system 2 of information sources, which is provided at the nose of the airplane, and which can measure an incidence value $\alpha mes$;

means 6 which can determine, in the manner specified hereinbelow, using the incidence value $\alpha mes$ measured by said incidence probe 5, an incidence angle $\alpha GLA$ which is linked to a disturbance due to wind as considered in the present invention; and means 7 which are linked via a link 8 to said means 6 and which compare this incidence angle $\alpha GLA$ to a first predetermined incidence angle value, for example 1°.

The means 6 and 7 can be part of a computation unit 10. Said means 7 deduce from the abovementioned comparison the existence of a disturbance due to wind, if said incidence angle $\alpha GLA$ is greater than this first predetermined value and, when such a disturbance is detected, they inform said means 4 of this via a link 9.

Said means 4 then determine, in the manner specified hereinbelow, said deflection commands by using said incidence angle $\alpha GLA$ which they receive from said computation unit 10.

Thus, the device 1 according to the invention is able to detect, using said monitoring means 3, and this in an accurate and reliable way, any disturbance due to wind, such as a discrete gust or a continuous turbulence for example, which can generate an increase of the loads on the wings of the airplane.

Furthermore, when such a disturbance is detected, the device 1 orders the deflection of control surfaces S1 to Sn so as to alleviate these loads. The deflection of these control surfaces S1 to Sn is achieved at a maximum speed, which makes it possible to limit the flexing of the wings caused by the disturbance and makes it possible to dynamically alleviate the load level existing on the wings, as specified further hereinbelow.

Thanks to this dynamic load alleviation of GLA (Gust Load Alleviation) type, it is possible to obtain a saving on the structural weight of the wings of the airplane, which makes it possible in particular to alleviate the cost of building and operating said airplane.

The dynamic load alleviation implemented by the device 1 is therefore implemented when the incidence angle $\alpha$GLA exceeds a given threshold, corresponding to said first predetermined value (for example 1°). Taking this threshold into account makes it possible to avoid any triggering of the alleviation function for low turbulences. This makes it possible in particular to avoid overworking the actuators A1 to An of the control surfaces S1 to Sn. Furthermore, this threshold renders the decoupling between wind and maneuver more robust.

Furthermore, in a particular embodiment, said monitoring means 3 are also able to detect the end of a disturbance due to wind (disturbance that has previously been detected), and the actuators A1 to An apply the deflection commands to said control surfaces S1 to Sn, continuously, for a predetermined time (for example five seconds) after the end of this disturbance. This particular embodiment provides for the following advantages:
- avoiding various electroelastic couplings;
- having the deflection implemented by the device 1 operate also as a passive turbulence alleviation (PTA) type function. In practice, this predetermined time, and the activation threshold and a gain specified hereinbelow, are chosen so that, on a very severe turbulence, the control surfaces S1 to Sn are deflected to the maximum and remain deflected throughout the turbulent flight phase; and
- avoiding monitoring information relating to the wind to warn of oscillatory failures.

It will be noted that the wing loads on a gust are mainly driven by the response of the first flexible mode of the wings of the airplane. The aim of the GLA type load alleviation implemented by the device 1 is to alleviate these loads by introducing an excitation which is opposite to the wind for this first flexible mode. This first flexible mode of the wings is a symmetrical flexing. The deformation is therefore greater at the wing tips. Also, in a preferred embodiment, said control surfaces S1 to Sn are ailerons of the airplane, which usually are provided at the ends of the wings. These ailerons are therefore particularly well suited to controlling said first abovementioned wing mode, and this via a symmetrical movement.

Also, according to the invention, the deflection commands generated by said means 4 and applied to said ailerons via said actuators A1 to An are such that the various ailerons of the airplane are deflected symmetrically relative to the longitudinal axis of the airplane.

The device according to the invention thus makes it possible to generate an alleviation of the flexing of the wings through two effects:
- the deflection of the external ailerons modifies (by a quasi-static effect) the distribution of the lift along the span of the wings in favor of a more internal position, which alleviates the flexing moment of the wings for a given lift; and
- the deflection at high speed (maximum speed) of the ailerons generates a dynamic response relative to a flexing mode of the wings, which neutralizes at least a part of the dynamic response generated by the disturbance due to wind.

It will be noted that, in the context of the present invention, to be effective, the actual deflection of the control surfaces S1 to Sn (which are provided on the wings of the airplane) must be achieved at the very moment when the wind which is causing the disturbance (disturbance which has been detected previously by an incidence measurement performed at the nose of the airplane) reaches the wings. The response time (between the detection by the means 3, the generation of the deflection commands by the means 4 and their application by the actuators A1 to An) is directly linked to the speed corresponding to the dimensioning load and the geometry of the airplane. As an example, in the extreme case of VMO/MMO, with VMO (Velocity Maximum Operating) the maximum operating speed, and MMO (Maximum Operating Mach Number) the maximum operational Mach number, with a distance of 19.5 m between the nose of the airplane and the wing, it takes a gust 75 ms to arrive at the wing. In system terms, this is reflected in a maximum allowable time of 50 ms between the acquisition of the incidence value by the incidence probe 5 (or a plurality of probes 5) and the generation of the deflection command by the means 4. In order to optimize the processing and acquisition time, the incidence value $\alpha$mes measured by the probe or probes 5 is directly transmitted from this probe or these probes 5 to the means 6, for example primary flight control computers of the FCPC (Flight Control Primary Computer) type, therefore without passing (as is usually the case) through inertial reference units for example of ADIRU (Air Data Inertial Reference Unit) type. This value can thus be acquired in 10 ms.

Moreover, in a particular embodiment, said device 1 also comprises:
- means 14 which are linked via a link 15 to said means 4 and which are intended to calculate an auxiliary deflection command for at least one auxiliary control surface of the airplane, such as an elevator for example. In a preferred embodiment, this auxiliary deflection command is applied to a plurality of individual auxiliary control surfaces P1 to Pi of the airplane, i being an integer number. This auxiliary deflection command is such that it makes it possible to offset the nose-up or nose-down pitch moment that is generated by the deflection of said control surfaces S1 to Sn on application of the deflection command calculated by the means 4. Said means 14 therefore determine beforehand, in the usual way, said nose-up or nose-down pitch moment and deduce from it said auxiliary deflection command; and
- usual actuation means B1 to Bi which are linked via a link 16 to said means 14 and which can bring the auxiliary control surface or surfaces P1 to Pi (elevator, stabilizer, ailerons, spoilers, etc.) to a position representative of the auxiliary deflection command determined by said means 14.

In a particular embodiment, said computation unit 10 and said means 4 and 14 are part of a central processing unit 13 which is, for example, linked via a link 12 to the system 2 of information sources.

Moreover, in a preferred embodiment, the device 1 also comprises:
- usual means (not individually represented) which are part of said system 2 of information sources, and which are formed so as to determine the current values of the weight, the speed, the altitude and the configuration of the airplane; and
- means 18 which are linked via a link 19 to said system 2, which receive these current values and which activate (via a link 20) the alleviation function implemented by said central unit 13.

In a particular embodiment, said means 18 activate the alleviation function only if the following conditions are satisfied simultaneously, taking into account said current values of the weight, the speed, the altitude and the configuration of the airplane:
- the current weight of the airplane is situated in a predetermined weight range, for example [MTOW−Mj; MTOW] with MTOW (Maximum Take-Off Weight) being the maximum weight on take off and Mj being a predetermined weight value dependent in particular on the type of the airplane;
- the current speed of the airplane is situated within a predetermined speed range, for example [Vmin; VMO+Vj] with Vmin being a predetermined minimum speed, Vj a predetermined speed, and VMO the maximum operating speed;
- the current altitude of the airplane is less than a predetermined maximum altitude corresponding for example to 45 000 feet (approximately 13.5 km); and
- the current configuration of the airplane is a smooth (and not high-lift) configuration for which the leading edges and the flaps are retracted.

Thus, the means 18 limit the activation range of the alleviation function to only load stresses, in order not to activate it (and therefore not to reduce the maneuvering capability of the airplane) for cases which do not pose problems with respect to the loads.

In the context of the present invention, the load alleviation function, implemented by the device 1, can be dependent on the weight of the airplane, but also the weight of the fuel and its distribution, or even the weight of the payload. It can also be dependent on the position of the center of gravity of the airplane. Furthermore, it can be dependent on the position of the leading edges and flaps and not be limited to a smooth configuration.

Figure 2:
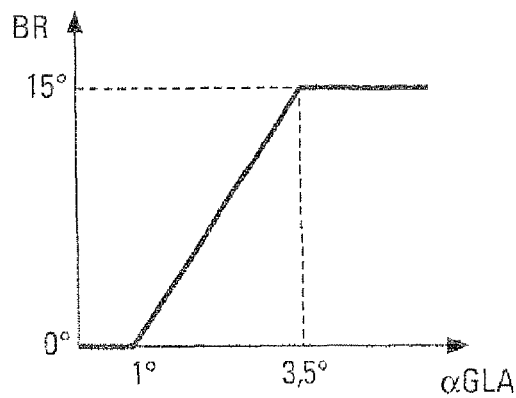
FIG. 2 is a graph illustrating a deflection angle of a control surface according to an incidence angle.

In a preferred embodiment, said means 4 determine the deflection commands which generate, on each control surface S1 to Sn, for example on each aileron:
- a maximum deflection angle, for example 15°, when said incidence angle $\alpha GLA$ (received from the computation unit 10) is greater than or equal to a second predetermined value, for example 3.5°, which is greater than said abovementioned first predetermined value, for example 1°, as represented in FIG. 2 which illustrates the deflection angle BR as a function of the incidence angle $\alpha GLA$; and
- a particular deflection angle, when said incidence angle $\alpha GLA$ is between said first and second predetermined values, for example between 1° and 3.5°. The value of said particular deflection angle is obtained from a linear relation (represented by a linear segment in FIG. 2) between a zero angle BR with said first predetermined value (1°) and said maximum deflection angle (15°) with said second predetermined value (35°).

Furthermore, as indicated previously, when said incidence angle $\alpha GLA$ is less than said first predetermined value (1°), no disturbance is detected, and therefore no deflection (with a view to alleviating loads) is implemented.

Said maximum deflection angle (for example 15°) is chosen so as to obtain a consistency between the GLA alleviation implemented by the present invention and a usual alleviation of the MLA (Maneuver Load Alleviation) type. This maximum deflection angle is not increased further to leave sufficient roll control. Furthermore, a dynamic analysis taking into account the efficiency of the actuators A1 to An has shown that beyond this maximum deflection angle, almost no advantage for the wing load is obtained.

Furthermore, as indicated previously, said control surfaces S1 to Sn are deflected at a maximum deflection speed. In a simplified embodiment, simply the maximum possible deflection speed is used for the control surfaces S1 to Sn concerned, which is fixed for each control surface S1 to Sn by an associated standard speed limiter.

However, in a preferred embodiment, the usual speed limiters of the actuators A1 to An are modified so as to obtain speeds that are greater than the maximum speeds usually allowed for said control surfaces S1 to Sn. To do this, the value of the deflection speed limiters defined in the flight control computers is increased to exploit the maximum capabilities of the actuator servo-controls. More specifically, a modification is made so as to obtain a maximum deflection speed which is such that the profile of the excitation generated on the wings by the deflection of said control surfaces S1 to Sn resembles, to within a margin, the profile of the wind which is the cause of said disturbance. This wind profile is determined in the usual way by analyzing the measured incidence value $\alpha mes$. This makes it possible to obtain a particularly effective alleviation of the loads generated on the wings.

As indicated previously, the incidence angle $\alpha GLA$ calculated by the means 6 is linked to a disturbance due to wind, that is, either to a discrete gust, or to a continuous turbulence. It is known that such a disturbance concerns high-frequency components of the wind. Also, the means 6 calculate this incidence angle $\alpha GLA$ so as not to implement the dynamic alleviation according to the invention, in a maneuver and/or for constant non-turbulent wind. It is therefore necessary to determine an incidence angle $\alpha GLA$ which takes account of the incidence value $\alpha mes$ actually measured on the airplane, but for which the components relating to effects that should not be taken into account have been eliminated.

Figure 3:
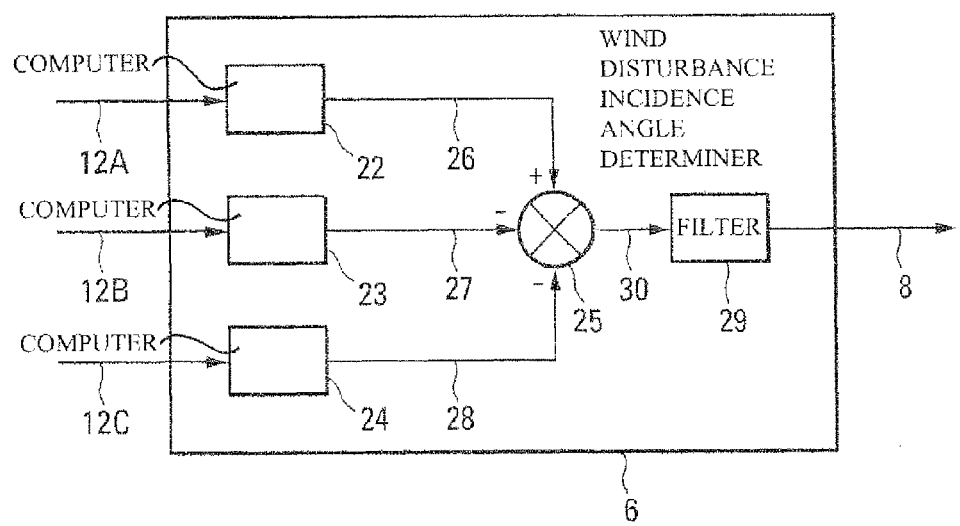
FIG. 3 is the block diagram of calculation means used to determine an incidence value which is linked to a disturbance due to wind.

To do this, in a particular embodiment, said means 6 comprise, as represented in FIG. 3:
- a computation means 22 which is intended to calculate an incidence angle $\alpha air$, from the measured incidence value $\alpha mes$;
- a computation means 23 which is intended to determine a ground incidence $\alpha gr$ (at the center of gravity of the airplane);
- a computation means 24 which is intended to determine a corrective (incidence value) term $\alpha cor$;
- a computation means 25 which is linked via links 26, 27 and 28 respectively to said computation means 22, 23 and 24, and which calculates an incidence value $\alpha 1$ using the following expression:

$$\alpha 1 = \alpha air - \alpha gr - \alpha cor;\text{ and}$$

- a filtering means 29 which is linked via a link 30 to said computation means 25 and which performs a high-pass filtering of the incidence value $\alpha 1$ received from said computation means 25 so as to form said incidence angle $\alpha GLA$ which it transmits via the link 8.

The high-pass filtering implemented by the filtering means 29 makes it possible to eliminate the continuous component of the wind corresponding to a constant wind (for which there is no need to implement the alleviation according to the invention), in order to retain only the high-frequency part of the wind which represents the disturbance that is to be detected.

In a particular embodiment:
- the system 2 of information sources comprises standard means (not individually represented) for measuring the pitch acceleration q1 of the airplane and the true speed VTAS of the airplane. The true speed VTAS (True Air Speed) is the speed of the center of gravity of the airplane relative to the undisturbed air; and said computation means 22 receives these measured values via a link 12A, and it calculates said incidence angle αair using the following expression:

$$\alpha air = \alpha mes + (q1.LAOA)/VTAS$$

in which LAOA is the distance between the incidence probe 5 and the mean center of gravity of the airplane.

Furthermore, to calculate the incidence αgr:

the system 2 of information sources comprises standard means (not individually represented) for measuring components relative to the airplane, which are defined relative to geographic axes (relative to a geographic fix R0) and specified hereinbelow; and said computation means 23 receives these measured components via a link 12B, and it is formed so as to calculate the incidence αgr using the following expression:

$$\alpha gr = A.tg(Uz1/Ux1) \quad (1)$$

in which:

A is a predetermined coefficient;

tg is a tangent; and

Uz1 and Ux1 are the coordinates of the ground speed relative to vertical and longitudinal axes of the airplane, which are determined from said measured components.

It is known that the components (Ux1, Uy1, Uz1) of the ground speed according to axes linked to the airplane (relative to an airplane fix R1) are not directly available on the airplane. However, the system 2 or the computation means 23 can calculate them from:

components of the speed of the airplane on geographic axes (Vnorth [expressed in knots], Veast [expressed in knots], Vz [expressed in feet per minute]) calculated by an inertial reference system of IRS type [365/366/367] which is part of the system 2. Vnorth is the speed according to North and Veast is the speed according to East; and a change of fix matrix M01 which can be determined in the usual way from roll, sideslip and pitch angles measured by appropriate means that are part of the system 2.

This matrix M01 which can be used to implement a change of the geographic fix R0 (comprising said geographic axes) to the airplane fix R1 is expressed:

$$M01 = \begin{bmatrix} M11 & M21 & M31 \\ M12 & M22 & M32 \\ M13 & M23 & M33 \end{bmatrix}$$

It is known that the ground speed vector in geographic fix R0 is expressed:

$$\overrightarrow{(U)}0 = \begin{cases} Ux0 = Vnorth \cdot \dfrac{1852}{3600} \\ Uy0 = Veast \cdot \dfrac{1852}{3600} \\ Uz0 = Vz \cdot \dfrac{0.3048}{60} \end{cases} \quad (2)$$

The values Ux0, Uy0 and Uz0 are expressed in meters per second in this expression (2).

It will be noted that the values having a reference "0" are relative to the geographic fix R0 and those having a reference "1" are relative to the airplane fix R1 in the present description.

By performing a change of fix using the abovementioned matrix M01, the following Ux1 and Uz1 values are obtained:

$$\begin{cases} Ux1 = M11 \cdot Ux0 + M21 \cdot Uy0 + M31 \cdot Uz0 \\ Uz1 = M13 \cdot Ux0 + M23 \cdot Uy0 + M33 \cdot Uz0 \end{cases}$$

With the duly obtained Ux1 and Uz1 values, the computation unit 24 then calculates the incidence αgr by using the above-mentioned expression (1).

Furthermore, to determine the corrective term αcor:

said system 2 of information sources comprises standard means (not individually represented) for measuring components relative to the airplane, which are defined relative to the geographic fix R0; and said computation means 24 receives these measured components via a link 12C, and it is formed so as to calculate the corrective term αcor using the following expression:

$$\alpha cor = (B.Wz1east)/VTAS$$

in which:

B is a predetermined coefficient;

Wz1 is a vertical component of the wind in the airplane fix R1, which is determined from said measured components; and VTAS is the measured true speed of the airplane.

The system 2 or the computation means 24 must therefore estimate the vertical component of the wind Wz1, which is defined as follows:

$$Wz1 = M13.Wx0 + M23.Wy0 + M33.Wz0 \quad (3)$$

To do this, the components of the wind in the geographic fix R0 are calculated by taking into account the differences between the air components (Vx0, Vy0, Vz0) relative to $\overrightarrow{V}(0)$ and the ground components (Ux0, Uy0, Uz0) relative to $\overrightarrow{(U)}0$. Since the ground components are known from the abovementioned expression (2) of $\overrightarrow{(U)}0$, the air components can be estimated.

Since the sideslip information is not acquired over a long distance, the estimated sideslip value β which is used in the usual way in the piloting laws is used, making it possible to calculate:

$$\overrightarrow{(V)}1 = \begin{cases} Vx1 = VTAS \cdot \cos(\alpha mes) \cdot \cos\beta \\ Vy1 = VTAS \cdot \sin\beta \\ Vz1 = VTAS \cdot \sin(\alpha mes) \cdot \cos\beta \end{cases}$$

With a change of fix, the following is obtained:

$$\overrightarrow{(V)}0 = [M01]^{-1} \cdot \overrightarrow{(V)}1 = [M01]^{T} \cdot \overrightarrow{(V)}1$$

From this, the components of the wind (Wx0, Wy0, Wz0) in the geographic fix R0, are deduced, using the following expression:

$$\overrightarrow{(W)}0 = \overrightarrow{(U)}0 - \overrightarrow{(V)}0,$$

which makes it possible to calculate said component Wz1 by using the abovementioned expression (3).

It will be noted that said links 12A, 12B and 12C are part of the link 12 of FIG. 1.

The invention claimed is:

1. A method of dynamically alleviating loads generated on an airplane by a disturbance due to wind, according to which method:
   A/ on a flight of the airplane, a monitoring is applied for detecting a disturbance due to wind, by implementing, automatically and repetitively, the following series of steps:
   a1) at least one incidence value is measured using at least one incidence probe which is provided at the nose of the airplane;
   a2) an incidence value $\alpha 1$ is calculated using the following expression:

$$\alpha 1 = \alpha air - \alpha gr - \alpha cor$$

in which:
   $\alpha air$ is an incidence angle which is determined from said measured incidence value;
   $\alpha gr$ represents a ground incidence at the center of gravity of the airplane; and
   $\alpha cor$ is a corrective term; and
   an incidence angle is determined using this incidence value $\alpha 1$ that is subjected to a high-pass filtering;
   a3) this incidence angle is compared to a first predetermined value; and
   a4) if said incidence angle is greater than this first predetermined value, a disturbance due to wind is detected; and
   B/ when a disturbance due to wind is detected, the following series of steps is automatically implemented:
   b1) using said incidence angle deflection commands are determined for control surfaces of the airplane, which are provided on the wings of said airplane, these deflection commands being such that they generate a deflection of said control surfaces according to a particular deflection angle, and this at a maximum deflection speed; and
   b2) the duly determined deflection commands are applied to said control surfaces.

2. The method as claimed in claim 1, wherein, in the step a4), the end of a disturbance due to wind is also detected and, in the step b2), said deflection commands are applied to said control surfaces for a predetermined time after said end of disturbance due to wind.

3. The method as claimed in claim 1, wherein:
   in the step a1), a pitch acceleration q1 and a true speed VTAS of the airplane are also measured; and
   in the step a2), said incidence angle $\alpha air$ is calculated using the following expression:

$$\alpha air = \alpha mes + (q1.LAOA)/VTAS$$

in which:
   $\alpha mes$ is said measured incidence value; and
   LAOA is the distance between said incidence probe and the mean center of gravity of the airplane.

4. The method as claimed in claim 1, wherein:
   in the step a1), components relative to the airplane are also measured which are defined relative to geographic axes; and
   in the step a2), the incidence $\alpha gr$ is calculated using the following expression:

$$\alpha gr = A.tg(Uz1/Ux1)$$

in which:
   A is a predetermined coefficient;
   tg is a tangent; and
   Uz1 and Ux1 are the coordinates of the ground speed relative to vertical and longitudinal axes of the airplane, which are determined from said measured components.

5. The method as claimed in claim 1, wherein:
   in the step a1), components relating to the airplane are measured which are defined relative to geographic axes; and
   in the step a2), the corrective term $\alpha cor$ is calculated using the following expression:

$$\alpha cor = (B.Wz1)/VTAS$$

in which:
   B is a predetermined coefficient;
   Wz1 is a vertical component of the wind, which is determined from said measured components; and
   VTAS is the true speed of the airplane.

6. The method as claimed in claim 1, wherein said maximum deflection speed is such that the profile of the excitation generated on its wings by the deflection of said control surfaces resembles, to within a margin, the profile of the wind which is the cause of said disturbance.

7. The method as claimed in claim 1, wherein said airplane comprises a plurality of ailerons, and wherein said control surfaces represent the various ailerons of the airplane, which are deflected symmetrically relative to the longitudinal axis of the airplane.

8. The method as claimed in claim 2, wherein, in the step b1), deflection commands are determined which generate, on each control surface:
   a maximum deflection angle, when said incidence angle is greater than or equal to a second predetermined value which is greater than said first predetermined value; and
   a particular deflection angle, when said incidence angle is between said first and second predetermined values, the value of said particular deflection angle being obtained from a linear relation between a zero angle with said first predetermined value and an angle corresponding to said maximum deflection angle with said second predetermined value.

9. The method as claimed in claim 1, wherein:
   in the step A, the current values of the weight, the speed, the altitude and the configuration of the airplane are also determined; and
   in the step B, said steps b1) and b2) are implemented, only if the following conditions are all satisfied, taking into account said duly determined current values:
   the weight of the airplane is situated within a predetermined weight range;
   the speed of the airplane is situated within a predetermined speed range;
   the altitude of the airplane is less than a predetermined maximum altitude; and
   the configuration of the airplane is a smooth configuration.

10. The method as claimed in claim 1, wherein:
    an auxiliary deflection command is calculated for at least one auxiliary control surface of the airplane, which makes it possible to offset a pitch moment generated by the deflection in the step b2) of said control surfaces; and
    this auxiliary deflection command is applied to said auxiliary control surface.

11. A device for dynamically alleviating loads generated on an airplane by a disturbance due to wind, said device comprising:

a monitoring section that monitors the airplane, making it possible to detect a disturbance due to wind on a flight of the airplane, said monitoring section comprising the following components:

at least one incidence probe which is provided at the nose of the airplane and which can measure an incidence value;

a first determining section that determines, using the incidence value measured by said incidence probe, an incidence angle which is linked to a disturbance due to wind, said first determining section comprising:

an element for calculating an incidence value $\alpha 1$ using the following expression:

$$\alpha 1 = \alpha air - \alpha gr - \alpha cor$$

in which:
$\alpha air$ is an incidence angle which is determined from said measured incidence value;
$\alpha gr$ represents a ground incidence at the center of gravity of the airplane; and
$\alpha cor$ is a corrective term; and an element for determining an incidence value using this incidence value $\alpha 1$ that is subjected to a high-pass filtering;

a comparator that compares this incidence angle to a first predetermined value; and a detector that detects from this comparison a disturbance due to wind, if said incidence angle is greater than this first predetermined value; and a second determining section that determines, when said monitoring section detects a disturbance due to wind, using said incidence angle, deflection commands for control surfaces of the airplane, which are provided on the wings of said airplane, these deflection commands being such that they generate a deflection of said control surfaces according to a particular deflection angle, and this at a maximum deflection speed; and actuators that apply said deflection commands to said control surfaces.

12. The device as claimed in claim 11, which also comprises:

a calculator that calculates an auxiliary deflection command which is intended for at least one auxiliary control surface of the airplane and which makes it possible to offset a pitch moment generated by the deflection of said control surfaces ; and actuators that apply this auxiliary deflection command to said auxiliary control surface.

13. An airplane, which comprises a device such as that specified under claim 11.

* * * * *